(12) United States Patent
Coffin (10) Patent No.: US 9,022,684 B2
(45) Date of Patent: May 5, 2015

(54) TURBINE ENGINE SHAFT COUPLING (75) Inventor: James B. Coffin, Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 81 days.

(21) Appl. No.: 13/366,948

(22) Filed: Feb. 6, 2012

(65) Prior Publication Data
US 2013/0202349 A1 Aug. 8, 2013

(51) Int. Cl.
F16D 1/02 (2006.01)
F01D 5/02 (2006.01)
F16D 1/033 (2006.01)

(52) U.S. Cl.
CPC ...... *F16D 1/02* (2013.01); *F01D 5/026* (2013.01); *F05D 2230/60* (2013.01); *F05D 2250/182* (2013.01); *F05D 2250/311* (2013.01); *F05D 2250/36* (2013.01); *F16D 1/033* (2013.01); Y10T 403/55 (2013.01)

(58) Field of Classification Search
CPC ......... F05D 2230/60; F05D 2250/182; F05D 2250/311; F05D 2250/36; F16D 1/02; F16D 1/033; F16D 2001/103; F01D 5/026; F01D 5/022; F01D 5/023; F01D 5/025; F02C 7/36; F16B 7/18; F16B 7/182
USPC ............... 403/296, 298, 359.1, 359.5, 359.6; 415/216.1; 416/244 R, 244 A
See application file for complete search history.

(56) References Cited

U.S. PATENT DOCUMENTS

| | | | |
|---|---|---|---|
| 1,633,798 A * | 6/1927 | Taylor | 285/330 |
| 3,449,926 A * | 6/1969 | Hawkins | 464/154 |
| 3,602,535 A * | 8/1971 | Behning et al. | 403/118 |
| 3,631,688 A * | 1/1972 | Quick | 464/182 |
| 3,900,270 A * | 8/1975 | Rhodes | 403/317 |
| 4,344,305 A * | 8/1982 | Holmes | 464/169 |
| 4,664,599 A | 5/1987 | Robbins et al. | |
| 4,813,717 A * | 3/1989 | Watts | 285/333 |
| 4,973,221 A | 11/1990 | Anderson et al. | |
| 5,580,183 A * | 12/1996 | Brackoneski et al. | 403/359.1 |

(Continued)

FOREIGN PATENT DOCUMENTS

FR 2633023 A1 * 12/1989

OTHER PUBLICATIONS

FR2633023A1 Espacenet Machine Translation of Description. Retrieved Dec. 30, 2013.*

(Continued)

*Primary Examiner* — Michael P Ferguson
*Assistant Examiner* — Matthieu Setliff
(74) *Attorney, Agent, or Firm* — O'Shea Getz P.C.

(57) ABSTRACT

A turbine engine shaft includes a first sub-shaft, a second sub-shaft and a tie shaft. A first bearing surface of the first sub-shaft axially engages a second bearing surface of the second sub-shaft. The tie shaft includes an intermediate tie shaft segment connected axially between a first tie shaft segment and a second tie shaft segment. The first tie shaft segment includes a first threaded tie shaft surface that is mated with a first threaded shaft surface of the first sub-shaft. The second tie shaft segment includes a second threaded tie shaft surface that is mated with a second threaded shaft surface of the second sub-shaft. The tie shaft also includes a sub-shaft bumper stop extending radially from the intermediate tie shaft segment to a bumper stop distal end, which has a radius that is greater than a radius the first and/or second threaded shaft surfaces.

18 Claims, 5 Drawing Sheets

(56) References Cited

U.S. PATENT DOCUMENTS

| | | | |
|---|---|---|---|
| 6,082,959 | A | 7/2000 | Van Duyn |
| 6,302,633 | B1 | 10/2001 | Poe |
| 6,428,269 | B1 | 8/2002 | Boratgis et al. |
| 6,551,009 | B2 * | 4/2003 | Bentley ............ 403/359.1 |
| 7,073,797 | B2 * | 7/2006 | Gaul .................... 279/8 |
| 7,249,768 | B2 | 7/2007 | Keba |
| 7,574,945 | B2 * | 8/2009 | Kondo ................ 74/724 |
| 7,591,594 | B2 * | 9/2009 | Charier et al. ........ 384/585 |
| 8,066,472 | B2 | 11/2011 | Coffin et al. |
| 8,491,267 | B2 * | 7/2013 | Glasspoole et al. ..... 416/221 |
| 2006/0269357 | A1 | 11/2006 | Webb |
| 2007/0014629 | A1 | 1/2007 | Webb |
| 2009/0116951 | A1 | 5/2009 | Coffin et al. |
| 2009/0123271 | A1 | 5/2009 | Coffin et al. |
| 2010/0087263 | A1 * | 4/2010 | Bolgar ................ 464/158 |
| 2010/0150702 | A1 | 6/2010 | Sheridan et al. |
| 2010/0158699 | A1 | 6/2010 | Makuszewski |
| 2011/0146298 | A1 | 6/2011 | Reinhardt et al. |
| 2011/0223026 | A1 | 9/2011 | Benjamin et al. |
| 2012/0219351 | A1 * | 8/2012 | Besler et al. .......... 403/37 |

OTHER PUBLICATIONS

Thread—Definition and More. Dictionary [online]. Merriam-Webster Dictionary, 2014 [retrieved on Apr. 9, 2014]. Retrieved from the Internet: <URL:www.merriam-webstercom/dictionary/thread>.*

International Search Report for PCT/US2013/024909 dated May 14, 3013.

* cited by examiner

TURBINE ENGINE SHAFT COUPLING

BACKGROUND OF THE INVENTION

1. Technical Field

The present invention relates generally to a turbine engine and, in particular, to a shaft coupling for a turbine engine shaft.

2. Background Information

A typical gas turbine engine may have a fan section, a compressor section, a combustor section and a turbine section that are sequentially arranged along an axis. The engine may include one or more turbine engine shafts that axially connect one or more rotors included in the fan section and/or the compressor section with one or more rotors included in the turbine section. Each shaft may include a plurality of sub-shafts. Adjacent ends of the sub-shafts may be connected together utilizing a tie-shaft. Properly aligning threads of the tie shaft with corresponding threads of the sub-shafts, however, may be difficult (e.g., require tedious alignment measurements) and time consuming.

SUMMARY OF THE DISCLOSURE

According to an aspect of the invention, a turbine engine shaft includes a first sub-shaft, a second sub-shaft and a tie shaft. The first sub-shaft includes a radial inner first threaded shaft surface that extends along an axis, and a first bearing surface that extends radially inward towards the first threaded shaft surface. The second sub-shaft includes a radial inner second threaded shaft surface that extends along the axis, and a second bearing surface that extends radially inward towards the second threaded shaft surface, where the second bearing surface axially engages the first bearing surface. The tie shaft includes an intermediate tie shaft segment connected axially between a first tie shaft segment and a second tie shaft segment. The first tie shaft segment includes a radial outer first threaded tie shaft surface that is mated with the first threaded shaft surface. The second tie shaft segment includes a radial outer threaded second tie shaft surface that is mated with the second threaded shaft surface. The tie shaft also includes a sub-shaft bumper stop that extends radially from the intermediate tie shaft segment to a bumper stop distal end, which has a radius that is greater than a radius of the first and/or second threaded shaft surfaces.

In an embodiment, the first sub-shaft also includes a bumper stop bearing surface that extends radially inward towards the first shaft surface. The bumper stop bearing surface is engaged the sub-shaft bumper stop during a first turbine engine shaft assembly step, and is spatially separated from the sub-shaft bumper stop during a subsequent second turbine engine shaft assembly step.

In an embodiment, the first sub-shaft also includes a bumper stop bearing surface that extends radially inward towards the first shaft surface. The first threaded shaft surface extends axially towards the bumper stop bearing surface from a first shaft surface end to a second shaft surface end, where the first shaft surface end is located a first axial distance from the bumper stop bearing surface. The first threaded tie shaft surface extends axially away from sub-shaft bumper stop from a first tie shaft surface end to a second tie shaft surface end, where the first tie shaft surface end is located a second axial distance from the sub-shaft bumper stop that is less than the first axial distance. In one embodiment, the first bearing surface is arranged axially between the bumper stop bearing surface and the first shaft surface end. In another embodiment, the first bearing surface includes the bumper stop bearing surface.

In an embodiment, the first threaded shaft surface has a first thread pitch, and the second threaded shaft surface has a second thread pitch that is different than the first thread pitch. In one embodiment, the second thread pitch is finer than the first thread pitch.

In an embodiment, the radius of the first threaded shaft surface is substantially equal to the radius of the second threaded shaft surface.

In an embodiment, the first sub-shaft also includes a radial inner first splined shaft surface that extends along the axis. The first bearing surface is arranged radially between the first threaded shaft surface and the first splined shaft surface. The second sub-shaft also includes a radial outer second splined shaft surface. The radial outer second splined shaft surface is mated with the first splined shaft surface, and is arranged axially between the second threaded shaft surface and the second bearing surface. In one embodiment, the first splined shaft surface and the second splined shaft surface are axially aligned with the sub-shaft bumper stop.

In an embodiment, the sub-shaft bumper stop includes an annular flange. In other embodiments, the sub-shaft bumper stop includes a plurality of protrusions that are arranged circumferentially around the intermediate tie shaft segment. In other embodiments, the sub-shaft bumper stop includes a threaded nut mated with a threaded, radial outer tie-shaft surface of the intermediate tie shaft segment. In still other embodiments, the sub-shaft bumper stop includes a fastener that is connected to the intermediate tie shaft segment.

The foregoing features and the operation of the invention will become more apparent in light of the following description and the accompanying drawings.

DETAILED DESCRIPTION OF THE INVENTION

Figure 1:
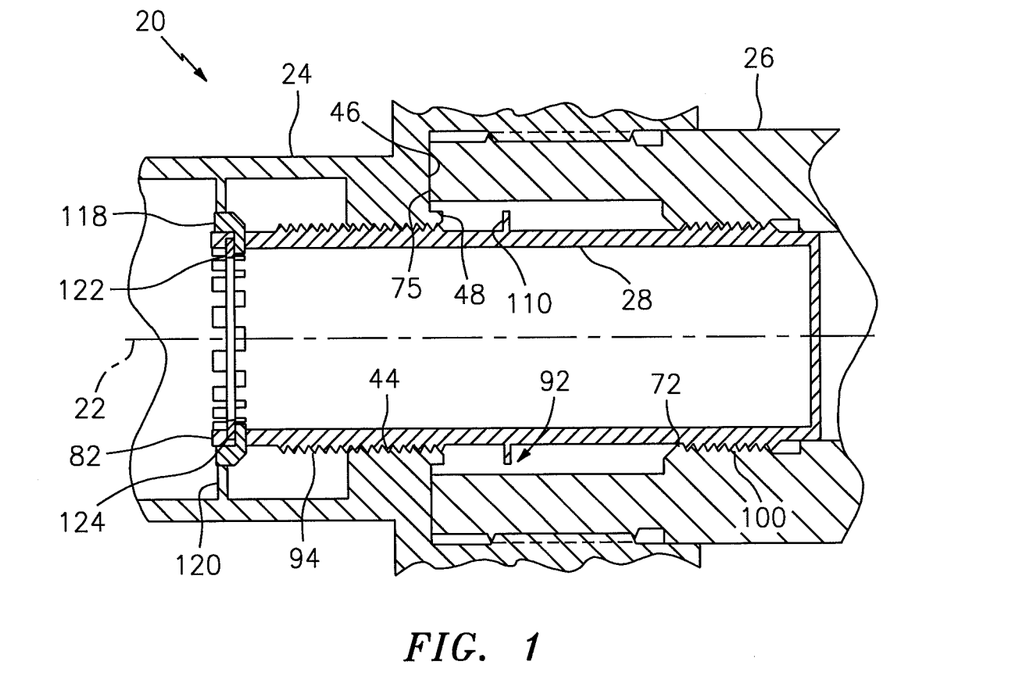
FIG. 1 is a partial sectional illustration of a coupling for a turbine engine shaft.

FIG. 1 illustrates a coupling for a turbine engine shaft 20 that may be configured in, for example, a gas turbine engine, a gas turbine power plant, a steam turbine engine, etc. The turbine engine shaft 20 extends along and is rotatable about an axis 22. The turbine engine shaft 20 may include a turbine engine first sub-shaft 24, a turbine engine second sub-shaft 26, and a turbine engine tie shaft 28.

Figure 2:
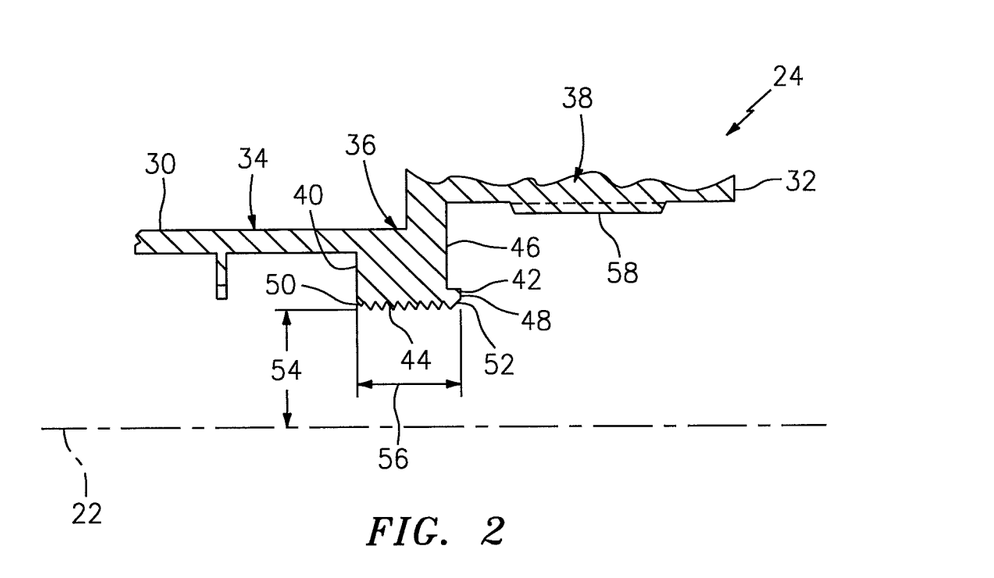
FIG. 2 is a top-half, partial sectional illustration of a first sub-shaft included in the turbine engine shaft illustrated in FIG. 1.

FIG. 2 illustrates a top-half portion of the first sub-shaft 24. The first sub-shaft 24 includes a (e.g., tubular) first sub-shaft sidewall 30 that extends axially to a first sub-shaft end 32. The first sub-shaft 24 may also include one or more sub-shaft segments such as, for example, a first intermediate shaft segment 34, a first threaded shaft segment 36, and a first splined shaft segment 38. The first intermediate shaft segment 34 may be configured, for example, to connect to one or more turbine engine rotors (not shown).

The first threaded shaft segment 36 extends axially between a first threaded shaft segment end 40 connected to, for example, the first intermediate shaft segment 34 and a second threaded shaft segment end 42. The first threaded shaft segment 36 includes a radial inner first threaded shaft surface 44, a first bearing surface 46, and a bumper stop bearing surface 48. The first threaded shaft surface 44 may extend axially from a first shaft surface end 50 at, for example, the first threaded shaft segment end 40 to a second shaft surface end 52 at, for example, the second threaded shaft segment end 42. The first threaded shaft surface 44 is configured with a first (e.g., right-hand) thread pitch and a first radius 54. The first bearing surface 46 extends radially inward towards the first threaded shaft surface 44, and may be axially recessed into the second threaded shaft segment end 42. The bumper stop bearing surface 48 is arranged at the second threaded shaft segment end 42, and may extend radially inward to the first threaded shaft surface 44. The bumper stop bearing surface 48 is located a first axial distance 56 from the first shaft surface end 50.

The first splined shaft segment 38 may extend axially from the first threaded shaft segment 36 (e.g., the first bearing surface 46) to the first sub-shaft end 32. The first splined shaft segment 38 includes a radial inner first splined shaft surface 58 that extends along the axis 22. The first splined shaft surface 58 may be arranged axially between the first bearing surface 46 and the first sub-shaft end 32.

Figure 3:
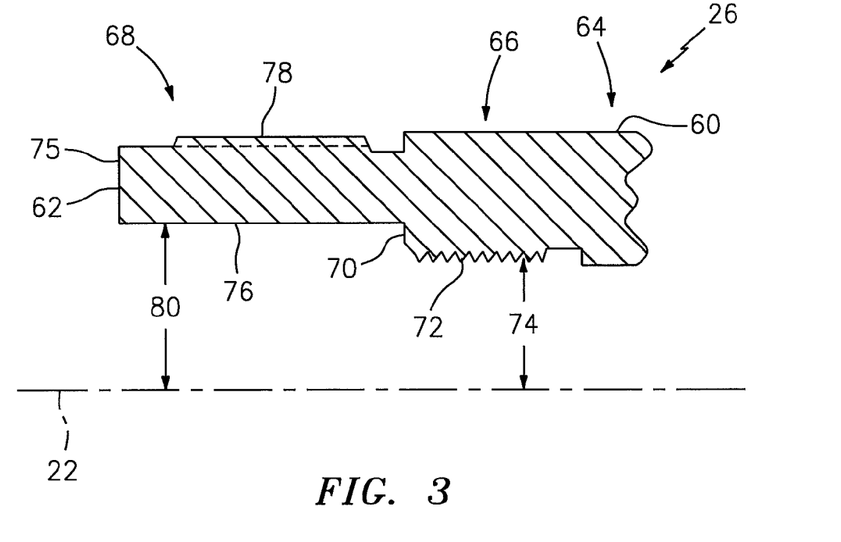
FIG. 3 is a top-half, partial sectional illustration of a second sub-shaft included in the turbine engine shaft illustrated in FIG. 1.

FIG. 3 illustrates a top-half portion of the second sub-shaft 26. The second sub-shaft 26 includes a (e.g., tubular) first sub-shaft sidewall 60 that extends axially to a second sub-shaft end 62. The second sub-shaft 26 may also include one or more sub-shaft segments such as, for example, a second intermediate shaft segment 64, a second threaded shaft segment 66, and a second splined shaft segment 68. The second intermediate shaft segment 64 may be configured, for example, to connect to one or more turbine engine rotors (not shown).

The second threaded shaft segment 66 may extend axially from the second intermediate shaft segment 64 to a threaded shaft segment end 70. The second threaded shaft segment 66 includes a radial inner second threaded shaft surface 72 that extends along the axis 22. The second threaded shaft surface 72 may extend axially from the threaded shaft segment end 70 (e.g., partially) towards the second intermediate shaft segment 64. The second threaded shaft surface 72 is configured with a second (e.g., left-hand) thread pitch and a second radius 74. The second thread pitch may be different (e.g., finer) than the first thread pitch, and the second radius 74 may be substantially equal to the first radius 54 (see FIG. 2).

The second splined shaft segment 68 may extend axially from the threaded shaft segment end 70 to a second bearing surface 75 at the second sub-shaft end 62. The second splined shaft segment 68 extends radially between a radial inner surface 76 and a radial outer second splined shaft surface 78. The radial inner surface 76 is configured with a third radius 80 that is greater than the first radius 54 (see FIG. 2) and the second radius 74. The second splined shaft surface 78 extends along the axis 22, and may be arranged between the threaded shaft segment end 70 and the second sub-shaft end 62.

Figure 4:
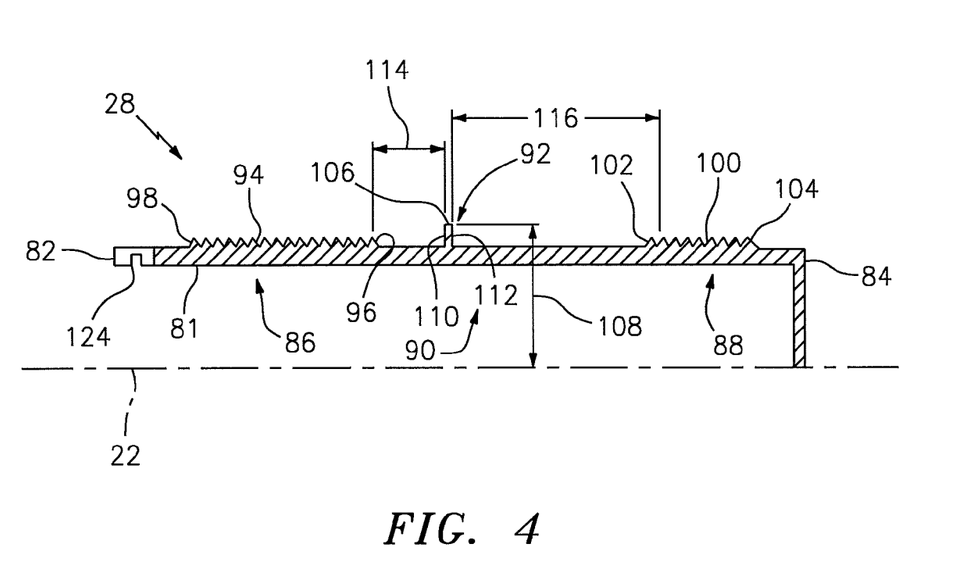
FIG. 4 is a top-half, partial sectional illustration of a tie shaft included in the turbine engine shaft illustrated in FIG. 1.

FIG. 4 illustrates a top-half portion of the tie shaft 28. The tie shaft 28 includes a (e.g., tubular) tie shaft sidewall 81 that extend axially between a (e.g., castellated) first tie shaft end 82 and an endwall at a second tie shaft end 84. The tie shaft 28 also includes a threaded first tie shaft segment 86, a threaded second tie shaft segment 88, an intermediate tie shaft segment 90 and a sub-shaft bumper stop 92. The first tie shaft segment 86 may extend axially from the first tie shaft end 82 to the intermediate tie shaft segment 90. The first tie shaft segment 86 includes a radial outer first threaded tie shaft surface 94. The first threaded tie shaft surface 94 may extend axially from the intermediate tie shaft segment 90 at a first tie shaft surface end 96 to a second tie shaft surface end 98. The second tie shaft segment 88 includes a radial outer second threaded tie shaft surface 100. The second threaded tie shaft surface 100 may extend axially from the intermediate tie shaft segment 90 at a first tie shaft surface end 102 to a second tie shaft surface end 104. The intermediate tie shaft segment 90 is connected axially between the first tie shaft segment 86 and the second tie shaft segment 88.

The sub-shaft bumper stop 92 extends radially from the intermediate tie shaft segment 90 to a bumper stop distal end 106. The bumper stop distal end 106 is configured with a fourth radius 108 that is greater that the first radius 54 (see FIG. 2) and/or the second radius 74 (see FIG. 3), and is less than the third radius 80 (see FIG. 3). The sub-shaft bumper stop 92 also extends axially between a first bumper stop surface 110 and a second bumper stop surface 112. The first bumper stop surface 110 is located a second axial distance 114 from the first tie shaft surface end 96 that may be less than the first axial distance 56 (see FIG. 2). The second bumper stop surface 112 is located a third axial distance 116 from the first tie shaft surface end 102.

Figure 5:
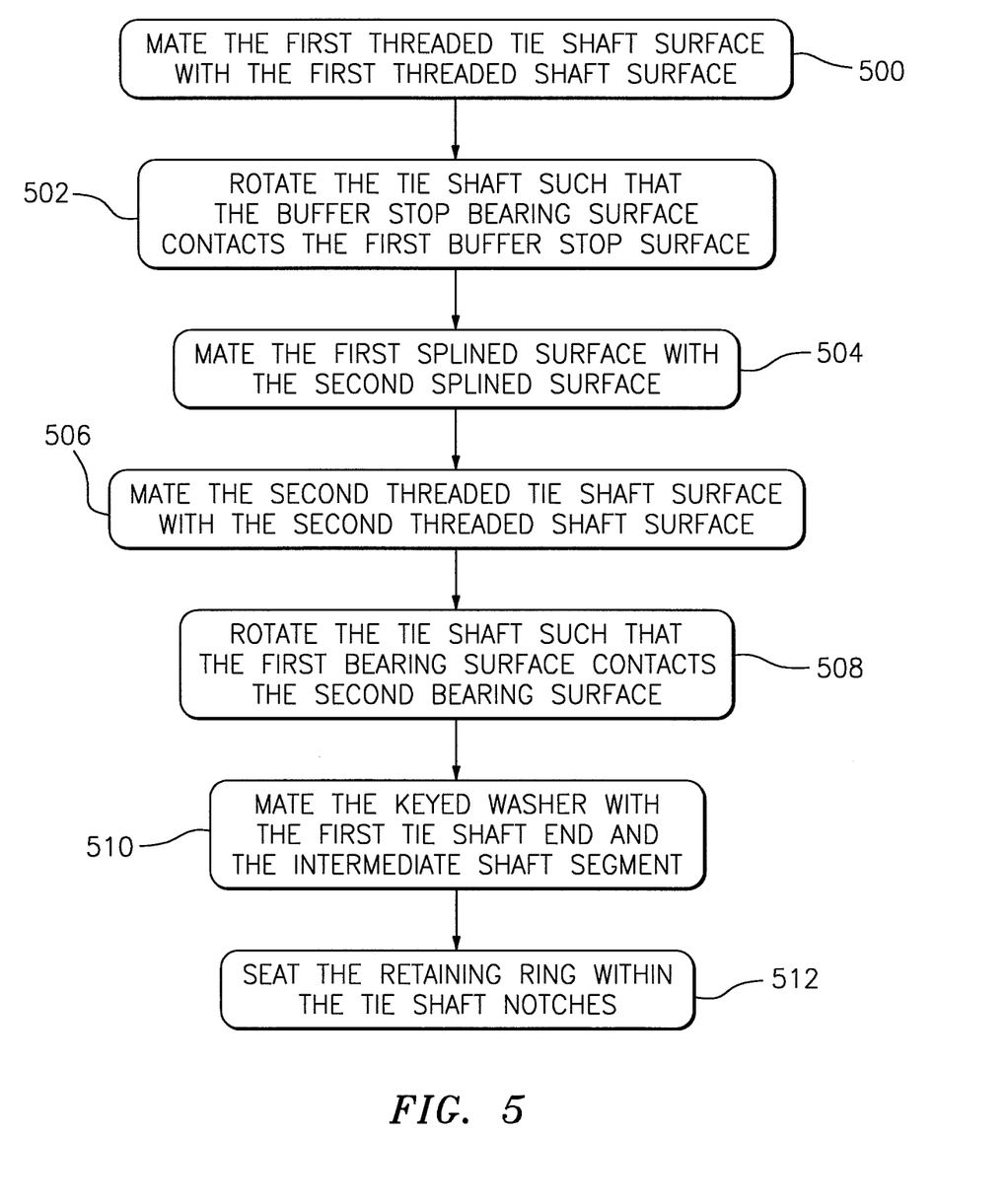
FIG. 5 is a flow diagram of a method for assembling the turbine engine shaft.
Figure 6:
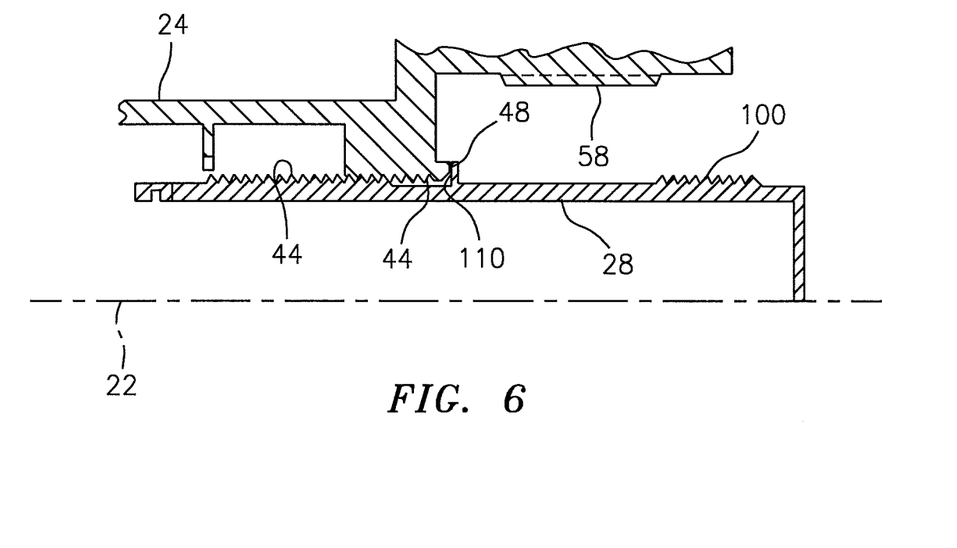
FIG. 6 is a top-half, partial sectional illustration of the first sub-shaft and the tie shaft during an assembly step.
Figure 7:
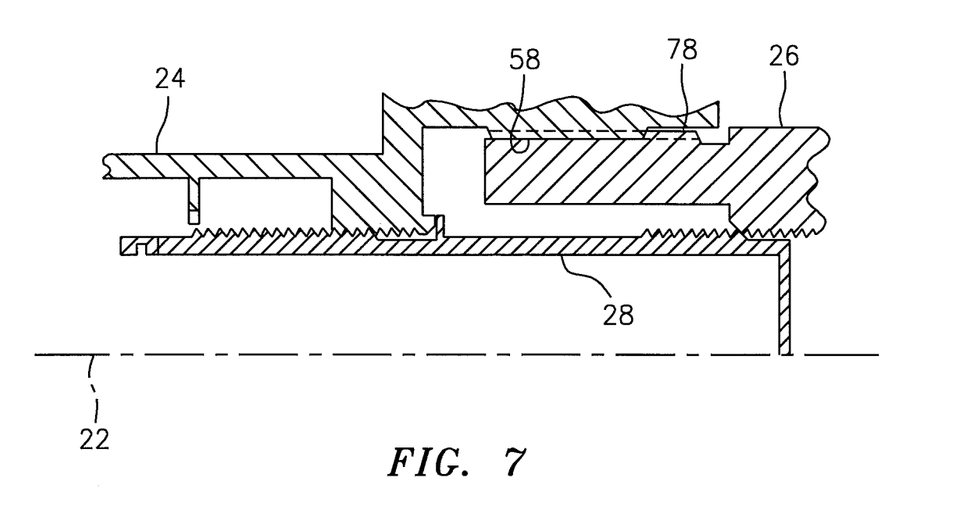
FIG. 7 is a top-half, partial sectional illustration of the first sub-shaft, the second sub-shaft and the tie shaft during another assembly step.

FIG. 5 is a flow diagram of a method for assembling the turbine engine shaft 20. Referring to FIGS. 5 and 6, in step 500, the first threaded tie shaft surface 94 is mated with (e.g., threaded into) the first threaded shaft surface 44. In step 502, the tie shaft 28 is rotated in a first (e.g., clockwise) direction relative to the first sub-shaft 24 until, for example, the bumper stop bearing surface 48 axially engages with (e.g., contacts) the first bumper stop surface 110. In this manner, the sub-shaft bumper stop 92 may be utilized to set depth of pre-engagement of the first threaded tie shaft surface 94 with the first threaded shaft surface 44 without, for example, alignment measurements. Referring to FIGS. 5 and 7, in step 504, the first splined shaft surface 58 is mated with the second splined shaft surface 78. Referring to FIGS. 5 and 1, in step 506, the second threaded tie shaft surface 100 is mated with the second threaded shaft surface 72. In step 508, the tie shaft 28 is rotated in a second (e.g., counter clockwise) direction relative to the first sub-shaft 24 and the second sub-shaft 26 until, for example, the first bearing surface 46 axially engages with the second bearing surface 75, which spatially separates the bumper stop bearing surface 48 from the first bumper stop surface 110. In this manner, the sub-shaft bumper stop 92 may be utilized during the turbine engine shaft 20 assembly to axially align (i) the first threaded tie shaft surface 94 with the first threaded shaft surface 44 and/or (ii) the second threaded tie shaft surface 100 with the second threaded shaft surface 72 without, for example, alignment measurements or other installation gauging. The sub-shaft bumper stop 92 therefore may reduce shaft assembly time and provide more repeatable and narrower assembly tolerances.

In step 510, a keyed (e.g., castellated) washer 118 may be mated with the first tie shaft end 82 and a (e.g., castellated) annular flange 120 extending radially inwards from the first intermediate shaft segment 34 to prevent the tie shaft 28 from rotating relative to the first sub-shaft 24 and the second sub-shaft 26 during turbine engine operation. In step 512, a retaining ring 122 may be seated within tie shaft notches 124 (see also FIG. 4) to hold the keyed washer 118 in position.

Figures 8, 9, 10:
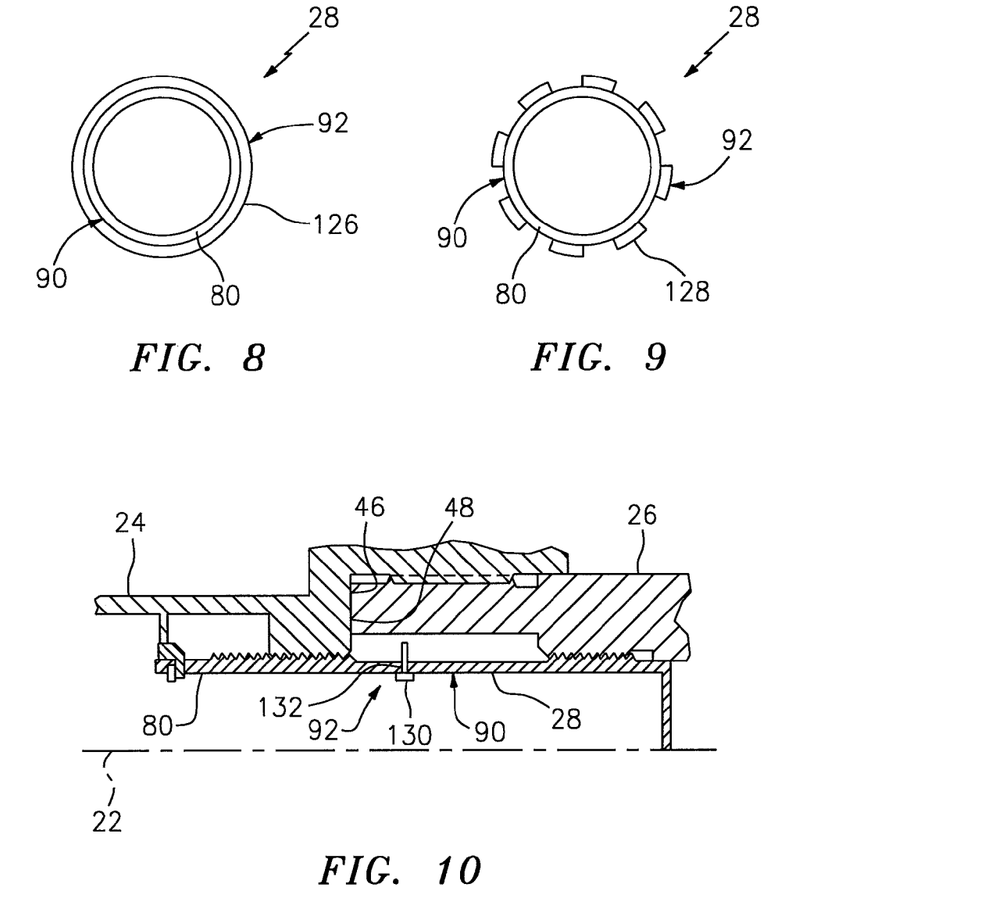
FIG. 8 is a cross-sectional illustration of the tie shaft included in the turbine engine shaft illustrated in FIG. 1.
FIG. 9 is a cross-sectional illustration of another tie shaft.
FIG. 10 is a top-half, partial sectional illustration of another turbine engine shaft.
Figure 11:
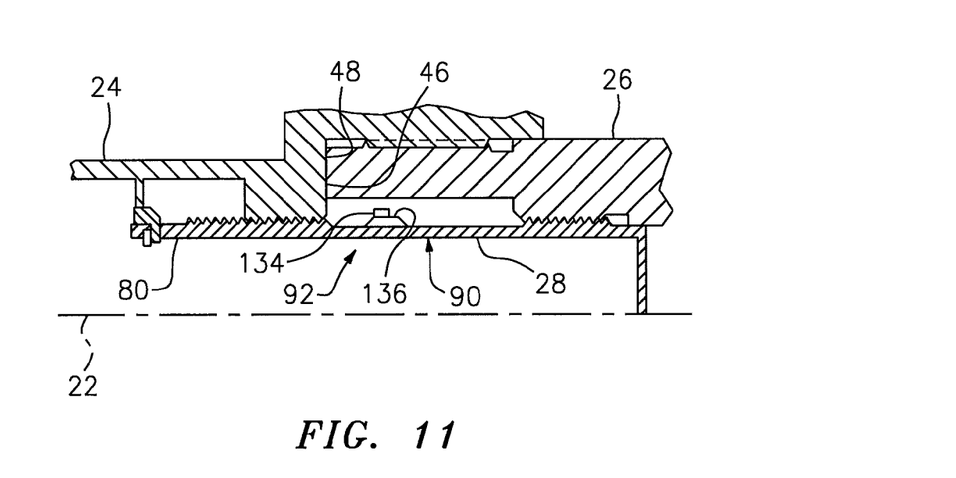
FIG. 11 is a top-half, partial sectional illustration of another turbine engine shaft.

The sub-shaft bumper stop 92 may be implemented with various different configurations, and may be formed integral to or discrete from the intermediate tie shaft segment 90. In one embodiment, for example as illustrated in FIG. 8, the sub-shaft bumper stop 92 may be configured as a (e.g., cylindrical) annular flange 126 that extends circumferentially around the intermediate tie shaft segment 90. In another embodiment, for example as illustrated in FIG. 9, the sub-shaft bumper stop 92 may include one or more radial protrusions 128 that are (e.g., discretely and uniformly) arranged circumferentially around the intermediate tie shaft segment 90. In still another embodiment, for example as illustrated in FIG. 10, the sub-shaft bumper stop 92 may include at least one fastener 130 (e.g., a pin, screw, etc.) that extends through a corresponding aperture 132 in the intermediate tie shaft segment 90. In still another embodiment, for example as illustrated in FIG. 11, the sub-shaft bumper stop 92 may include a threaded nut 134 mated with a threaded, radial outer tie-shaft surface 136 of the intermediate tie shaft segment 90. The present invention, however, is not intended to be limited to any of the aforesaid sub-shaft bumper stop configurations.

In some embodiments, for example as illustrated in FIGS. 10 and 11, the first bearing surface 46 may be configured with the bumper stop bearing surface 48. In other embodiments, for example, the first sub-shaft 24 and the second sub-shaft 26 may be connected together with one or more fasteners rather than the splined connection illustrated in the drawings. A person of ordinary skill in the art will recognize that the first sub-shaft 24 and/or the second sub-shaft 26 may have various alternate configurations depending upon the particular application and/or design constraints. The present invention, therefore, is not intended to be limited to any particular sub-shaft configuration.

While various embodiments of the present invention have been disclosed, it will be apparent to those of ordinary skill in the art that many more embodiments and implementations are possible within the scope of the invention. Accordingly, the present invention is not to be restricted except in light of the attached claims and their equivalents.

What is claimed is:

1. A turbine engine shaft, comprising:
   a first sub-shaft comprising a radial inner first threaded shaft surface that extends along an axis, and a first bearing surface that extends radially inward towards the first threaded shaft surface;
   a second sub-shaft comprising a radial inner second threaded shaft surface that extends along the axis, and a second bearing surface that extends radially inward towards the second threaded shaft surface, the second bearing surface axially engaging the first bearing surface; and
   a tie shaft comprising:
      an intermediate tie shaft segment connected axially between a first tie shaft segment and a second tie shaft segment, the first tie shaft segment comprising a radial outer first threaded tie shaft surface mated with the first threaded shaft surface, and the second tie shaft segment comprising a radial outer threaded second tie shaft surface mated with the second threaded shaft surface; and
      a sub-shaft bumper stop extending radially from the intermediate tie shaft segment to a bumper stop distal end that comprises a radius that is greater than a radius of at least one of the first threaded shaft surface and the second threaded shaft surface;
   wherein the first sub-shaft further comprises a radial inner first splined shaft surface that extends along the axis, and the second sub-shaft further comprises a radial outer second splined shaft surface that is mated with the first splined shaft surface;
   wherein the intermediate tie shaft segment is configured integral with the first tie shaft segment and the second tie shaft segment as a one-piece body;
   wherein the first bearing surface is arranged radially between the first threaded shaft surface and the first splined shaft surface;
   wherein the second splined shaft surface is arranged axially between the second threaded shaft surface and the second bearing surface; and
   wherein the first splined shaft surface and the second splined shaft surface are radially outward aligned with the sub-shaft bumper stop.

2. The shaft of claim 1, wherein
the first sub-shaft further comprises a bumper stop bearing surface that extends radially inward towards the first shaft surface; and
the bumper stop bearing surface engages the sub-shaft bumper stop during a first turbine engine shaft assembly step, and is spatially separated from the sub-shaft bumper stop during a second turbine engine shaft assembly step that is subsequent to the first turbine engine shaft assembly step.

3. The shaft of claim 1, wherein
the first sub-shaft further comprises a bumper stop bearing surface that extends radially inward towards the first shaft surface;
the first threaded shaft surface extends axially towards the bumper stop bearing surface from a first shaft surface end to a second shaft surface end, and the first shaft surface end is located a first axial distance from the bumper stop bearing surface; and
the first threaded tie shaft surface extends axially away from sub-shaft bumper stop from a first tie shaft surface end to a second tie shaft surface end, and the first tie shaft surface end is located a second axial distance from the sub-shaft bumper stop that is less than the first axial distance.

4. The shaft of claim 3, wherein the first bearing surface is arranged axially between the bumper stop bearing surface and the first shaft surface end.

5. The shaft of claim 3, wherein the first bearing surface comprises the bumper stop bearing surface.

6. The shaft of claim 1, wherein the first threaded shaft surface comprises a first thread pitch, and the second threaded shaft surface comprises a second thread pitch that is different than the first thread pitch.

7. The shaft of claim 6, wherein the second thread pitch is finer than the first thread pitch.

8. The shaft of claim 1, wherein the radius of the first threaded shaft surface is substantially equal to the radius of the second threaded shaft surface.

9. The shaft of claim 1, wherein the sub-shaft bumper stop comprises an annular flange.

10. The shaft of claim 1, wherein the sub-shaft bumper stop comprises a plurality of protrusions that are arranged circumferentially around the intermediate tie shaft segment.

11. The shaft of claim 1, wherein the sub-shaft bumper stop comprises a threaded nut mated with a threaded, radial outer tie-shaft surface of the intermediate tie shaft segment.

12. The shaft of claim 1, wherein the sub-shaft bumper stop comprises a fastener that is connected to the intermediate tie shaft segment.

13. A turbine engine shaft, comprising:
a first sub-shaft comprising a radial inner first threaded shaft surface that extends along an axis, and a first bearing surface that extends radially inward towards the first threaded shaft surface;
a second sub-shaft comprising a radial inner second threaded shaft surface that extends along the axis, and a second bearing surface that extends radially inward towards the second threaded shaft surface, the second bearing surface axially engaging the first bearing surface; and
a tie shaft comprising:
an intermediate tie shaft segment connected axially between a first tie shaft segment and a second tie shaft segment, the first tie shaft segment comprising a radial outer first threaded tie shaft surface mated with the first threaded shaft surface, and the second tie shaft segment comprising a radial outer threaded second tie shaft surface mated with the second threaded shaft surface; and
a sub-shaft bumper stop extending radially from the intermediate tie shaft segment to a bumper stop distal end that comprises a radius that is greater than a radius of at least one of the first threaded shaft surface and the second threaded shaft surface;
wherein the first sub-shaft further comprises a radial inner first splined shaft surface that extends along the axis, and the second sub-shaft further comprises a radial outer second splined shaft surface that is mated with the first splined shaft surface;
wherein the sub-shaft bumper stop does not radially engage the second sub-shaft;
wherein the first bearing surface is arranged radially between the first threaded shaft surface and the first splined shaft surface;
wherein the second splined shaft surface is arranged axially between the second threaded shaft surface and the second bearing surface; and
wherein the first splined shaft surface and the second splined shaft surface are radially outward aligned with the sub-shaft bumper stop.

14. The shaft of claim 13, wherein the bumper stop distal end comprises a substantially flat surface.

15. The shaft of claim 13, wherein the intermediate tie shaft segment is configured integral with the first tie shaft segment and the second tie shaft segment.

16. The shaft of claim 13, wherein the first threaded shaft surface comprises a first thread pitch, and the second threaded shaft surface comprises a second thread pitch that is different than the first thread pitch.

17. The shaft of claim 16, wherein the second thread pitch is finer than the first thread pitch.

18. The shaft of claim 13, further comprising a keyed washer configured to rotatably fix the tie shaft to the first sub-shaft.

* * * * *